United States Patent
Lee et al.

(10) Patent No.: US 9,427,923 B2
(45) Date of Patent: Aug. 30, 2016

(54) FOOD PACKING MATERIAL HAVING HYDROPHOBICITY, MANUFACTURING METHOD AND MOLD THEREOF

(75) Inventors: Jin Hwan Lee, Seoul (KR); Kyoung Sik Jo, Seoul (KR); Sang Wook Lee, Seoul (KR); Min Young Park, Seoul (KR); Sang Eon Lee, Daejeon (KR); Kang Won Lee, Daejeon (KR); Jin Ha Kim, Daejeon (KR); Heon Kwang Lim, Daejeon (KR); Seung Seob Lee, Seoul (KR)

(73) Assignees: CJ CHEILJEDANG CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 42 days.

(21) Appl. No.: 14/233,354

(22) PCT Filed: Aug. 31, 2011

(86) PCT No.: PCT/KR2011/006432
§ 371 (c)(1),
(2), (4) Date: Jan. 16, 2014

(87) PCT Pub. No.: WO2013/012123
PCT Pub. Date: Jan. 24, 2013

(65) Prior Publication Data
US 2014/0183201 A1    Jul. 3, 2014

(30) Foreign Application Priority Data
Jul. 21, 2011    (KR) .................. 10-2011-0072405

(51) Int. Cl.
*B29D 22/00*    (2006.01)
*B29C 59/02*    (2006.01)
*B65D 1/48*    (2006.01)
*B29C 33/38*    (2006.01)

(52) U.S. Cl.
CPC ........... *B29D 22/003* (2013.01); *B29C 59/022* (2013.01); *B65D 1/48* (2013.01); *B29C 33/3842* (2013.01); *B29C 2059/023* (2013.01); *B29K 2995/0093* (2013.01)

(58) Field of Classification Search
CPC .......................... B29C 33/3842; E04G 13/02
USPC ..................................... 264/219, 31
See application file for complete search history.

(56) References Cited

U.S. PATENT DOCUMENTS

| | | | |
|---|---|---|---|
| 5,376,392 A | 12/1994 | Ikegami et al. | 426/127 |
| 5,603,997 A | 2/1997 | Lindgren et al. | 428/34.2 |

(Continued)

FOREIGN PATENT DOCUMENTS

| | | |
|---|---|---|
| CN | 201816924 U | 5/2011 |
| DE | 10 2007 020 655 A1 | 11/2008 |

(Continued)

OTHER PUBLICATIONS

International Search Report mailed Nov. 1, 2012, issued in corresponding International Patent Application No. PCT/KR2011/008064.

(Continued)

*Primary Examiner* — Brent O'Hern
(74) *Attorney, Agent, or Firm* — Stein IP, LLC

(57) ABSTRACT

Provided is an food packing material, manufacturing method and mold thereof having hydrophobicity including a number of columns formed in one side of food packing material. The disclosure may provide food packing material, manufacturing method and mold thereof in which an amount of contents off a wall of the food packing material may be minimized by hydrophobicity.

7 Claims, 3 Drawing Sheets

(56) References Cited

U.S. PATENT DOCUMENTS

| | | | |
|---|---|---|---|
| 5,820,910 A | 10/1998 | Jury | 426/104 |
| 6,187,396 B1 | 2/2001 | Moller | 428/34.3 |
| 2005/0003146 A1 | 1/2005 | Spath | 428/105 |
| 2005/0170053 A1 | 8/2005 | Milani | 426/414 |
| 2008/0299380 A1 | 12/2008 | Choi et al. | 428/315.7 |
| 2009/0081476 A1 | 3/2009 | Saucy | 428/614 |
| 2009/0252982 A1 | 10/2009 | O'Keefe | 428/573 |
| 2010/0173167 A1 | 7/2010 | Vissing et al. | 428/447 |
| 2010/0327485 A1 | 12/2010 | Maaninen et al. | 264/293 |
| 2011/0088567 A1* | 4/2011 | Deroulers | A21B 3/138 99/426 |

FOREIGN PATENT DOCUMENTS

| | | |
|---|---|---|
| JP | 3-215031 A | 9/1991 |
| JP | 2010-242081 A | 10/2010 |
| KR | 200-0006584 A | 1/2000 |
| KR | 10-2004-0061492 A | 7/2004 |
| KR | 10-2004-0076150 A | 8/2004 |
| KR | 10-2006-0001849 A | 1/2006 |
| KR | 10-0556982 B1 | 3/2006 |

OTHER PUBLICATIONS

European Office Action dated Feb. 28, 2014, issued to European Application No. 11872767.6.

International Search Report mailed Jun. 26, 2012, issued in corresponding International Application No. PCT/KR2011/006432.

Korean Office Action dated Feb. 18, 2013, issued to the corresponding Korean Application No. 2011-0072405.

European Extended Search Report dated Mar. 18, 2015, issued to the corresponding European Application No. 11869522.0.

* cited by examiner (a)

(b)

(a)

(b)

(a)

(b)

FOOD PACKING MATERIAL HAVING HYDROPHOBICITY, MANUFACTURING METHOD AND MOLD THEREOF

CROSS-REFERENCE TO RELATED APPLICATIONS

This application is a national stage of International Application No. PCT/KR2011/006432, filed Aug. 31, 2011, which claims the benefit of Korean Application No. 10-2011-0072405, filed Jul. 21, 2011, in the Korean Intellectual Property Office. All disclosures of the document(s) named above are incorporated herein by reference.

BACKGROUND OF THE INVENTION

1. Field of the Invention

The present disclosure relates to food packing material and, more particularly, to food packing material, manufacturing method and mold thereof to implement hydrophobicity of the food packing material by applying a MEMS technology.

2. Description of the Related Art

The food packing material is used for food packing and has been improved to improve the stability of food storage only. However, a problem in that the food packing material is stained with contents has not been solved.

For example, if you look at the food packing material used as a cap of a floating eating fermented milk products, after a consumer purchase the fermented milk products, when opening the food packing material, the food packing material is stained with a certain amount of contents. Therefore, the consumer is always forced to abandon a certain amount of contents off the food packing material.

These problem has been raised by the food packing material keeping retort food and the like having high viscosity such as a curry.

SUMMARY OF THE INVENTION

Technical Problem

The disclosure had been made in an effort to provide food packing material, manufacturing method and mold thereof in which an amount of contents off a wall of the food packing material may be minimized by the hydrophobicity.

Technical Solution

An exemplary embodiment of the disclosure provides (a) preparing a mold in which a number of grooves are formed, and (b) forming a number of the columns corresponding to the groove in one side of the food packing material by pressurizing the mold to the food packing material.

Further, (a) the preparing of the mold includes (a-1) preparing a first metal layer; (a-2) laminating a photoresist film at a top of the first metal layer; (a-3) patterning the photoresist film and forming a number of the photoresist patterns to be spaced at a predetermined interval each other, and (a-4) forming the mold by laminating a second metal layer at the first metal layer.

The photoresist patterns are formed of the cylinder and the polyprism and arranged with a grid shape.

The second metal layer is laminated at the first metal layer by performing a galvanoplasty.

The second metal layer may form a number of grooves at the top of the photoresist pattern by laminating at the other part in which the photoresist pattern is not present in the first metal layer.

In addition, the first metal layer is laminated at a silicon layer being present bottom thereof.

The first metal layer is formed of a titanium.

The second metal layer is formed of nickel or Au.

An exemplary embodiment of the disclosure provides a mold for manufacturing food packing material having hydrophobicity, comprising: a first metal layer; a number of the photoresist patterns being formed in the top of the first metal layer and to be spaced at a predetermined interval each other, and a second metal layer forming a number of grooves at the top of the photoresist pattern by laminating at the other part in which the photoresist pattern is not present in the first metal layer.

The grooves are formed of the cylinder and the polyprism and arranged with a grid shape.

In addition, the first metal layer is laminated at a silicon layer being present bottom thereof.

The first metal layer is formed of a titanium.

The second metal layer is formed of nickel or Au.

An exemplary embodiment of the disclosure provides a food packing material having hydrophobicity, comprising a number of columns formed in one side of food packing material.

Further, the columns are formed to be spaced at a predetermined interval each other and arranged with a grid shape.

The columns are formed of the cylinder and the polyprism.

Advantageous Effects

According to an exemplary embodiment of the disclosure, the food packing material, the manufacturing method and the mold thereof, in which an amount of contents off a wall of the food packing material may be minimized by the hydrophobicity, are provided.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3A and FIG. 3B to FIG. 6A and FIG. 6B show a manufacturing process of the mold used in the manufacturing method of FIG. 2A and FIG. 2B.

FIG. 4A shows (a-2) the laminating of the photoresist film and FIG. 4B shows a cross-section taken along the line A4-B4 of FIG. 4A.

FIG. 5A shows (a-3) the forming of the photoresist pattern and FIG. 5B shows a cross-section taken along the line A5-B5 of FIG. 5A.

FIG. 6A shows (a-4) the laminating of the second layer and FIG. 6B shows a cross-section taken along the line A6-B6 of FIG. 6A.

DETAILED DESCRIPTION OF THE EMBODIMENTS

Figure 1:
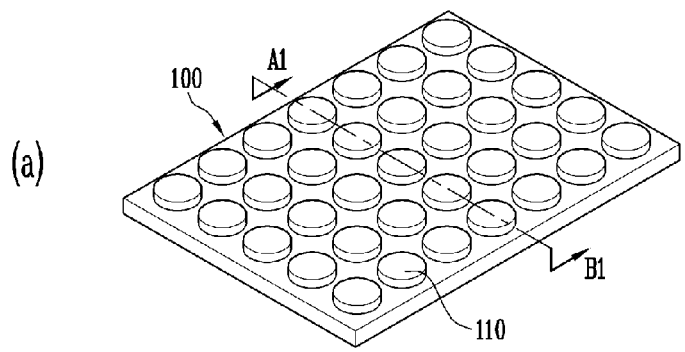
FIG. 1A is a perspective view showing food packing material having hydrophobicity according to an exemplary embodiment of the disclosure.
FIG. 1B is a sectional view of food packing material showed in FIG. 1A(base on A1-B1)
Figure 1:
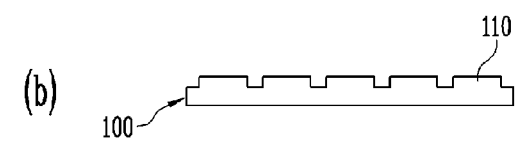

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, the food packing material having the hydrophobicity, the manufacturing method and the mold thereof according to the disclosure will be described with reference to embodiments of the disclosure and drawings describing them.

FIG. 1A is a perspective view showing food packing material having hydrophobicity according to an exemplary embodiment of the disclosure and FIG. 1B is a sectional view of food packing material showed in FIG. 1A(based on A1-B1).

In FIG. 1A and FIG. 1B, the food packing material having hydrophobicity 100(hereinafter, food packing material) according to the exemplary embodiment of the disclosure is used for packing food, for instance, can be used as a cap of fermented milk products or packing material such as retort food and, particularly, includes a number of columns 110 formed in one side thereof to implement hydrophobicity.

The columns 110 can be implemented with a fine size by the so called MEMS(Micro Electro Mechanical Systems) technology and a method manufacturing the columns 110 will be described in detail later.

In such a case, a number of the columns 110 are formed in one side of the food packing material 100 at predetermined intervals each other.

Air is located in the space between each columns 110. The air pushes water or fluid on the food packing material 100 off to outside.

Accordingly, since the food packing material formed of a number of columns 110 have hydrophobicity, even though the food packing material is stained with contents, the contents can easily flow down. Accordingly, the amount of the contents on the food packing material 100 can be minimized, such that the consumer can eat a larger amount of the contents.

In addition, when using chemical coating material to the food packing material 100 for hydrophobicity, a safety problem of worrying food can be solved.

In such a case, a number of columns 110 formed in the food packing material 100 may be formed of a grid shape as shown in FIG. 1A so as to implement uniform hydrophobicity. Further, a number of columns 110 may be formed of a cylinder shape or many forms of a polyprism such as a trigonal prism, a square pillar, a hexagonal column and the like.

When the columns 110 are formed of the cylinder and the polyprism, a diameter thereof is preferably from 20 um to 60 um and a height thereof is preferably from 15 um to 100 um.

Further, the entire heights of the columns 110 are preferably set equally to the uniform hydrophobicity.

Figure 2:
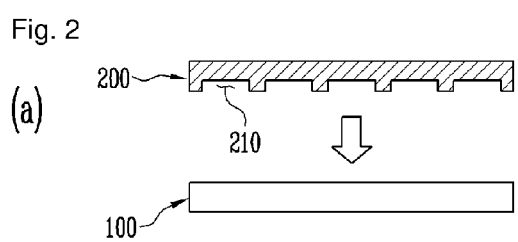
FIG. 2A and 2B shows a method manufacturing the food packing material showed in FIG. 1A and 1B.
Figure 2:
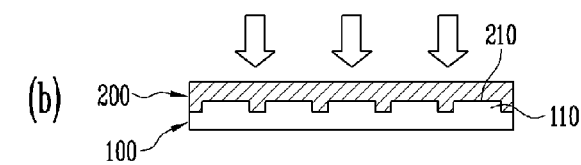
Figure 3:
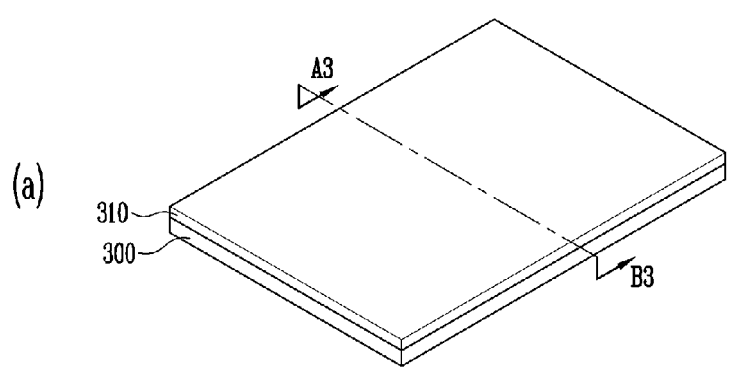
Figure 3:
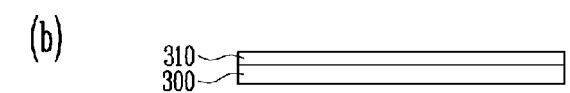
Figure 4:
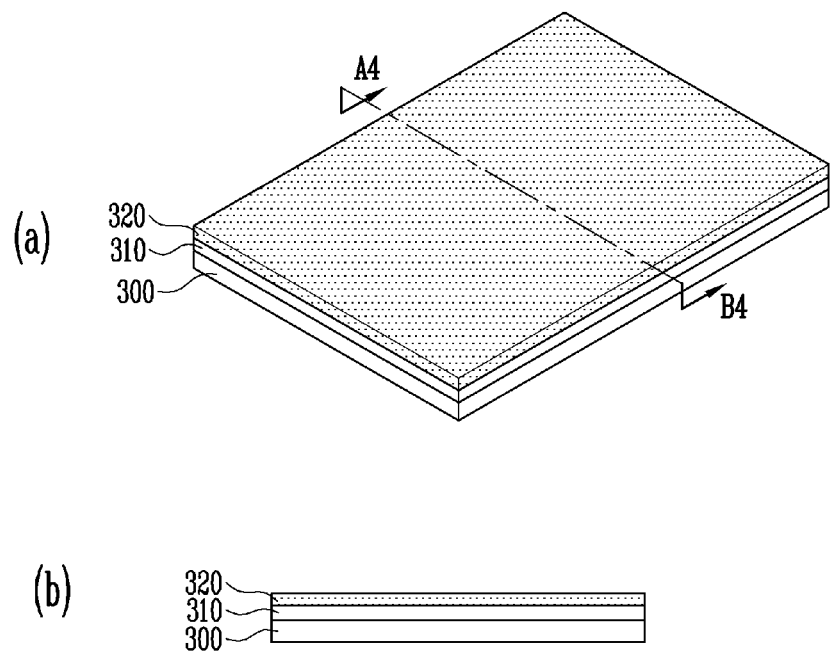
Figure 5:
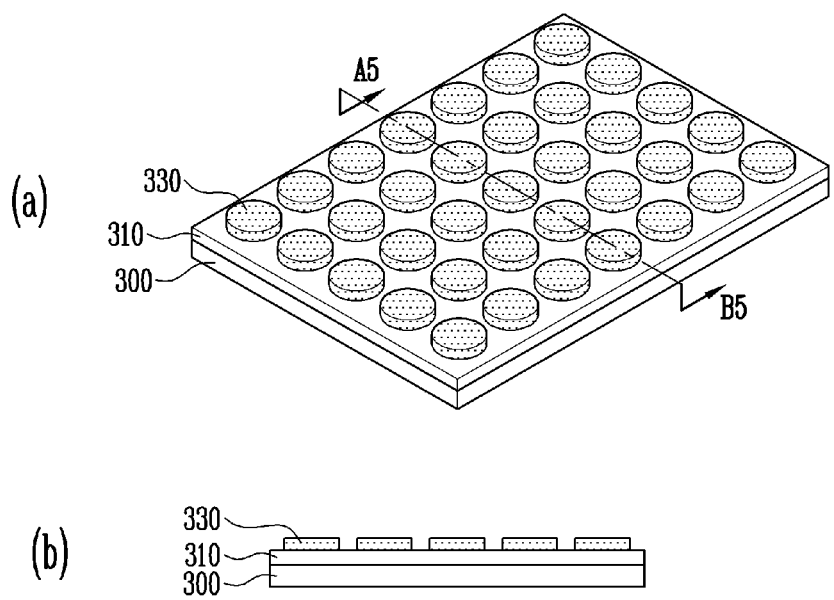
Figure 6:
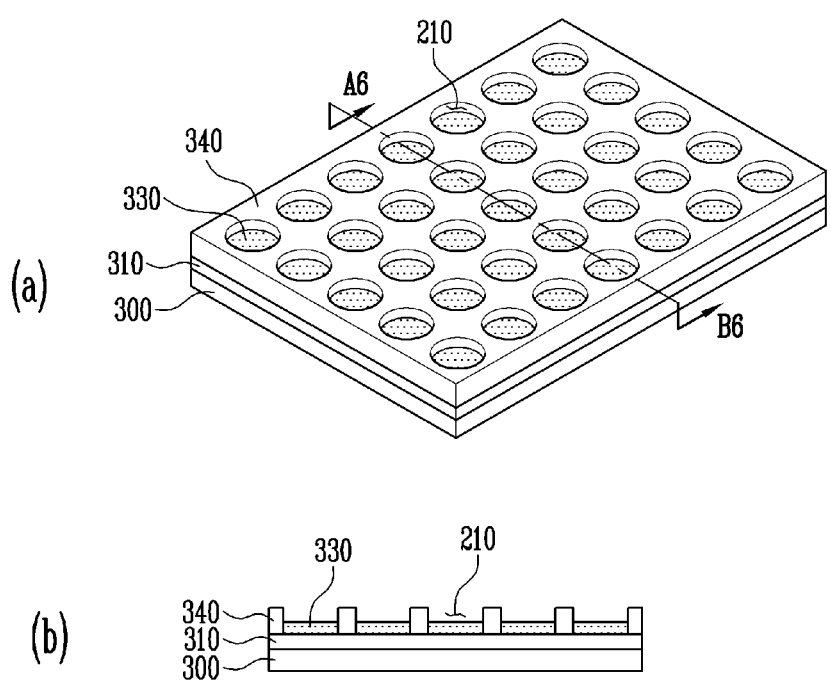

FIG. 2A and 2B shows a method manufacturing the food packing material showed in FIG. 1A and 1B.

In FIG. 2A and 2B, the method manufacturing the food packing material according to the exemplary embodiment of the disclosure is a way transferring a pattern that exists in a mold 200 into the food packing material 100 and include (a) preparing the mold 200, and (b) forming the columns 110.

In FIG. 2A, (a) in the preparing of the mold 200, prepare the mold 200 formed of a number of grooves 210 and the food packing material 100.

Now, the food packing material 100 is not formed as the columns 110 yet and is preferably synthetic resins such as PP(Polypropylene) and PET(polyethyleneterephthalate).

A number of grooves 210 are formed to correspond to a shape of the columns 110 to form the columns 110, are formed of the cylinder and the polyprism and are preferably arranged with the grid shape.

In FIG. 2B, (b) in the forming of the columns 110, after the food packing material 100 and the mold 200 are aligned, a number of the columns 110 corresponding to the groove 210 are formed in the one side of the food packing material 100 by pressurizing the mold 200 to the food packing material 100.

In other words, when joining the mold 200 to the food packing material 100 by heat and pressure, parts that do not correspond to the grooves 210 in the food packing material 100 is pressurized, a number of the columns 110 to be protruded to the top are formed in the parts that correspond to the grooves 210 in the food packing material 100.

Such a columns 110 are manufactured according to the shape of the grooves 210. Therefore, when forming the grooves 210 into a cylindricalness, the columns 110 is also formed of the cylindricalness and when forming the grooves 210 into the polyprism, the columns 110 is also formed of the polyprism.

FIG. 3A and FIG. 3B to FIG. 6A and FIG. 6B show a manufacturing process of the mold used in the manufacturing method of FIG. 2A and FIG. 2B in detail and the manufacturing method of the food packing material will be described with reference to them more in detail.

According to the exemplary embodiment of the disclosure, (a) the preparing of the mold includes (a-1) preparing a first metal layer, (a-2) laminating a photoresist film, (a-3) forming the photoresist pattern and (a-4) laminating a second metal layer.

FIG. 3A shows (a-1) the preparing of the first layer and FIG. 3B shows a cross-section taken along the line A3-B3 of FIG. 3A.

In FIG. 3A and FIG. 3B, (a-1) in the preparing of the first metal layer, the first metal layer 310 is prepared.

Now, the first metal layer 310 may be situated at the top of a silicon layer 300 to form the uniform layer.

In particular, the first metal layer 310 may be formed of titanium and other metals.

FIG. 4A shows (a-2) the laminating of the photoresist film and FIG. 4B shows a cross-section taken along the line A4-B4 of FIG. 4A.

In FIG. 4A and FIG. 4B, (a-2) in the laminating of the photoresist film, the photoresist film 320 is laminated at the top of the first metal layer 310.

Now, the photoresist film 320 to be laminated may be formed by a positive photoresist or a negative photoresist. For example, AZ9260 is used as the positive photoresist and SU-8 is used as the negative photoresist.

FIG. 5A shows (a-3) the forming of the photoresist pattern and FIG. 5B shows a cross-section taken along the line A5-B5 of FIG. 5A.

In FIG. 5A and FIG. 5B, (a-3) in the forming of the photoresist pattern, the photoresist film 320 laminated on the first metal layer 310 is patterned and a number of the photoresist patterns 330 are formed to be spaced at a predetermined interval each other.

That is, the photoresist film 320 can be patterned with a number of the photoresist pattern 330 by a exposure and develop process used in a typical Photolithography process.

A number of the photoresist film 330 are formed of the cylinder and the polyprism and are preferably arranged with the grid shape.

This is to form the grooves 210 formed in the mold 200 by the cylinder and the polyprism and to arrange the grooves 210 formed in the mold 200 with the grid shape, and to form the columns 110 formed in the food packing material 100 by the polyprism shape such as the trigonal prism, the square pillar, the hexagonal column and the like as well as the cylinder shape and to arrange the columns 110 formed in the food packing material 100 with the grid shape.

FIG. 6A shows (a-4) the laminating of the second layer and FIG. 6B shows a cross-section taken along the line A6-B6 of FIG. 6A.

In FIG. 6A and 6B, (a-4) in the laminating of the second metal layer, forming of mold 200 is finished by laminating the second metal layer 340 on the first metal layer 310.

Now, the second metal layer 340 may form a number of grooves 210 at the top of the photoresist pattern 330 by laminating at the other part in which the photoresist pattern 330 is not present in the first metal layer 310.

That is, a number of grooves 210 may be formed by photoresist patterns 330 being present at a bottom, and the second metal layer 340 being present therebetween.

Further, (a-4) in the laminating of the second metal layer, the second metal layer 340 can be laminated at the first metal layer 310 by performing a galvanoplasty.

In such a case, since the photoresist pattern 330 has not a conductivity, the second metal layer 340 is grown on the first metal layer 310 only having the conductivity.

Accordingly, the mold 200 including a number of grooves 210 may be prepared.

In particular, the second metal layer 340 may be formed of nickel, Au and other metals.

A number of grooves 210 with a fairly fine size may be formed in the mold 200 by the MEMS technology and the food packing material 100 may be also formed of fairly fine columns 110.

The mold 200 manufacturing the food packing material according to an exemplary embodiment of the disclosure may be manufactured the method described above and therefore the mold 200 includes the first metal layer 310, the photoresist pattern 330 and the second metal layer 340(refer to In FIG. 6A and FIG. 6B).

The first metal layer 310 may be formed on the silicon layer 300 and a number of the photoresist patterns 330 to be spaced at a predetermined interval each other are situated at the top of the first metal layer 310.

The second metal layer 340 may form grooves 210 at the top of the photoresist pattern 330 by laminating at the other part in which the photoresist pattern 330 is not present in the first metal layer 310.

Finally, complex processes such as Photolithography for each the food packing material to implement hydrophobicity is not needed by easily forming the fine columns 110 in each food packing material 100 by the mold 200 manufactured as above. Therefore, manufacturing cost, manufacturing time, manufacturing personnel will be reduced.

It is appreciated that the disclosure can be carried out in other specific forms without changing a technical idea or essential characteristics by one having ordinary skilled in the art to which the disclosure pertains to. Therefore, embodiments described above is for illustration purpose in all respect but not limited to them. The scope of the disclosure is represented by claims described below rather than the detailed description, and any change and variations derived from the meaning, the scope and the concept of equality of claims should be interpreted to be included to the scope of the disclosure.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. The manufacturing method of food packing material having hydrophobicity, comprising:
   (a) preparing a mold in which a number of grooves are formed, and
   (b) forming a number of the columns corresponding to the groove in one side of the food packing material by pressurizing the mold to the food packing material, wherein (a) the preparing of the mold includes:
   (a-1) preparing a first metal layer;
   (a-2) laminating a photoresist film at a top of the first metal layer;
   (a-3) patterning the photoresist film and forming a number of the photoresist patterns to be spaced at a predetermined interval each other; and
   (a-4) forming the mold by laminating a second metal layer at the first metal layer.

2. The manufacturing method of food packing material having hydrophobicity according to claim 1, wherein the photoresist patterns are formed of the cylinder or the polyprism and arranged with a grid shape.

3. The manufacturing method of food packing material having hydrophobicity according to claim 1, wherein the second metal layer is laminated at the first metal layer by performing a galvanoplasty.

4. The manufacturing method of food packing material having hydrophobicity according to claim 1, wherein the second metal layer may form a number of grooves at the top of the photoresist pattern by laminating at the other part in which the photoresist pattern is not present in the first metal layer.

5. The manufacturing method of food packing material having hydrophobicity according to claim 1, wherein the first metal layer is laminated at a silicon layer being present bottom thereof.

6. The manufacturing method of food packing material having hydrophobicity according to claim 1, wherein the first metal layer is formed of a titanium.

7. The manufacturing method of food packing material having hydrophobicity according to claim 1, wherein the second metal layer may be formed of nickel or Au.

* * * * *